(12) United States Patent
Kang et al.

(10) Patent No.: US 8,594,036 B2
(45) Date of Patent: Nov. 26, 2013

(54) METHOD FOR TRANSMITTING DATA BY APPLYING PRECODING MATRIX IN AN OPEN LOOP MIMO SYSTEM

(75) Inventors: Byeong Woo Kang, Anyang-si (KR); Dong Wook Roh, Anyang-si (KR); Dae Won Lee, Anyang-si (KR); Yu Jin Noh, Anyang-si (KR); Bong Hoe Kim, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 13/319,621

(22) PCT Filed: May 26, 2010

(86) PCT No.: PCT/KR2010/003321
§ 371 (c)(1),
(2), (4) Date: Nov. 9, 2011

(87) PCT Pub. No.: WO2010/140786
PCT Pub. Date: Dec. 9, 2010

(65) Prior Publication Data
US 2012/0063438 A1   Mar. 15, 2012

Related U.S. Application Data

(60) Provisional application No. 61/182,762, filed on Jun. 1, 2009.

(30) Foreign Application Priority Data

Oct. 21, 2009   (KR) ........................ 10-2009-0100359

(51) Int. Cl.
*H04W 4/00* (2009.01)
(52) U.S. Cl.
USPC ............................ 370/329; 370/341; 370/431

(58) Field of Classification Search
USPC ......... 370/328–330, 338, 339, 341, 400, 401, 370/431; 375/295, 296, 346, 347
See application file for complete search history.

(56) References Cited

U.S. PATENT DOCUMENTS

| | | | | |
|---|---|---|---|---|
| 7,944,985 | B2 * | 5/2011 | ElGamal et al. | 375/267 |
| 2006/0098568 | A1 * | 5/2006 | Oh et al. | 370/206 |
| 2007/0263746 | A1 * | 11/2007 | Son | 375/267 |
| 2009/0028264 | A1 * | 1/2009 | Zhang et al. | 375/267 |
| 2011/0110405 | A1 * | 5/2011 | Lee et al. | 375/219 |

OTHER PUBLICATIONS

Shi et al., "Linear Precoder Optimization for AQR Packet Retransmissions in Centralized Multiuser MIMO Uplinks", IEEE Transactions on Wireless Communications, vol. 7, No. 2, Feb. 2008, pp. 736-745.
Sun et al., "Progressive Linear Precoder Optimization for MIMO Packet Retransmissions Exploiting Channel Covariance Information", IEEE Transactions on Communications, vol. 56, No. 5, May 2008, pp. 818-827.
Zheng et al., "Design and Performance of Space-Time Precoder With Hybrid ARQ Transmission", IEEE Transactions on Vehicular Technology, vol. 58, No. 4, May 2009, pp. 1816-1822.

\* cited by examiner

*Primary Examiner* — Kerri Rose
(74) *Attorney, Agent, or Firm* — Birch, Stewart, Kolasch & Birch, LLP

(57) ABSTRACT

A method for transmitting data by applying a precoding matrix in an open-loop multiple input multiple output (MIMO) system is disclosed. The method comprises selecting a precoding matrix and applying the selected precoding matrix to data during initial transmission; selecting a precoding matrix and applying the selected precoding matrix to data to be retransmitted; and retransmitting the data to which the precoding matrix is applied, wherein an index of the precoding matrix applied to the data is determined based on the times of current retransmission times of the data and index of the precoding matrix applied during initial transmission of the data.

9 Claims, 11 Drawing Sheets

METHOD FOR TRANSMITTING DATA BY APPLYING PRECODING MATRIX IN AN OPEN LOOP MIMO SYSTEM

CROSS REFERENCE TO RELATED APPLICATIONS

This application is a National Phase of International Application No. PCT/KR2010/003321 filed on May 26, 2010 which claims the benefit under 35 U.S.C. §119(e) of U.S. Provisional Application No. 61/182,762 filed on Jun. 1, 2009 and to Patent Application No. 10-2009-0100359 filed in the Republic of Korea, on Oct. 21, 2009. The entire contents of all of the above applications are hereby incorporated by reference.

DETAILED DESCRIPTION OF THE INVENTION

1. Technical Field

The present invention relates to a multiple input multiple output (MIMO) communication system, and more particularly, to a method for efficiently providing a reference signal under the environment where antennas are additionally provided in the existing system.

2. Background Art

LTE Physical Structure

A 3rd generation partnership project (3GPP) supports a type 1 radio frame structure applicable to a frequency division duplex (FDD) and a type 2 radio frame structure applicable to time division duplex (TDD).

FIG. 1 is a diagram illustrating a structure of a type 1 radio frame. The type 1 radio frame includes 10 subframes, each of which includes two slots.

FIG. 2 is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One of these subframes includes two slots. The DwPTS is used for initial cell search, synchronization and channel estimation at a user equipment. The UpPTS is used for channel estimation and uplink transmission synchronization of the user equipment. The guard period is to remove interference occurring in an uplink due to multi-path delay of a downlink signal between the uplink and a downlink. Meanwhile, one subframe includes two slots regardless of a type of the radio frame.

FIG. 3 is a diagram illustrating a slot structure of an LTE downlink. As shown in FIG. 3, a signal transmitted from each slot can be expressed by a resource grid that includes $N_{RB}^{DL} \times N_{sc}^{RB}$ number of subcarriers and $N_{symb}^{DL}$ number of OFDM (orthogonal frequency division multiplexing) symbols. In this case, $N_{RB}^{DL}$ represents the number of resource blocks (RBs) in the downlink, $N_{sc}^{RB}$ represents the number of subcarriers that constitute one resource block (RB), and $N_{symb}^{DL}$ represents the number of OFDM symbols at one downlink slot.

FIG. 4 is a diagram illustrating a slot structure of an LTE uplink. As shown in FIG. 4, a signal transmitted from each slot can be expressed by a resource grid that includes $N_{RB}^{UL} \times N_{sc}^{RB}$ number of subcarriers and $N_{symb}^{UL}$ number of SC-FDMA (Single Carrier Orthogonal Frequency Division Multiple Access) symbols. In this case, $N_{RB}^{UL}$ represents the number of resource blocks (RBs) in the uplink, $N_{SC}^{RB}$ represents the number of subcarriers constituting one resource block (RB), and $N_{symb}^{UL}$ represents the number of SC-FDMA symbols at one uplink slot.

A resource element (RE) is a resource unit defined by indexes (a, b) within the uplink slot and the downlink slot and represents one subcarrier and one OFDM symbol.

FIG. 5 is a diagram illustrating an example of a structure of a downlink subframe. In FIG. 5, three OFDM symbols located at the front part of the first slot within one subframe correspond to a control region allocated to a control channel. The other OFDM symbols correspond to a data region allocated to a physical downlink shared channel (PDSCH). Examples of the downlink control channel used in the 3GPP LTE include PCFICH (Physical Control Format Indicator CHannel), PDCCH (Physical Downlink Control CHannel), and PHICH (Physical Hybrid-ARQ Indicator CHannel).

The PCFICH is transmitted from the first OFDM symbol of one subframe and transmits information related to the number of OFDM symbols used for transmission of the control channel within the subframe. The PHICH is to transmit a HARQ ACK (acknowledgement)/NACK (Negative Acknowledgement) signal in response to uplink transmission. Control information transmitted through the PDCCH is designated as downlink control information (DCI). The DCI includes uplink or downlink scheduling information or information related to uplink transmission power control command for a random user group. The PDCCH can transmit a transport format, resource allocation information of a downlink shared channel (DL-SCH), resource allocation information of an uplink shared channel (UL-SCH), paging information on a paging channel (PCH), system information on the DL-SCH, resource allocation information of an upper layer control message such as random access response on the PDSCH, a collection of transmission power control command for each UE within a random UE group, activity of voice over IP (VoIP), and the like. A plurality of PDCCHs can be transmitted within the control region.

The user equipment UE can monitor the plurality of PDCCHs. The PDCCH is transmitted by a collection of one or a plurality of continuous control channel elements (CCEs). The CCE is a logic allocation unit used to provide a coding rate to the PDCCH based on the status of a radio channel. The CCE corresponds to a plurality of resource element groups. The format of the PDCCH and available bits of the PDCCH are determined depending on the number of CCEs and correlation of the coding rate provided by the CCE. A base station determines a PDCCH format depending on the DCI transmitted to the UE and attaches cyclic redundancy check (CRC) to the control information.

The CRC is masked with unique ID (radio network temporary identifier (RNTI) depending on usage of the PDCCH or owner. If the PDCCH is for a specific UE, unique ID (for example, cell-RNTI; C-RNTI) of the UE can be masked with CRC. If the PDCCH is for a paging message, paging indicator identifier (for example, Paging-RNTI; P-RNTI) can be masked with CRS. If the PDCCH is for system information (in more detail, hereinafter referred to as system information block (SIB)), system information ID and system information RNTI (SI-RNTI) can be masked with CRC. In order to mark a random access response which is a response to random access preamble transmission of the UE, random access RNTI (random access-RNTI; RA-RNTI) can be masked with CRC.

FIG. 6 is a diagram illustrating a structure of an uplink subframe. As shown in FIG. 6, the uplink subframe on a frequency domain includes a control region and a data region. The control region is allocated to a physical uplink control channel (PUCCH) for carrying uplink control information. The data region is allocated to a physical uplink shared channel (PUSCH) for carrying data. In order to maintain single carrier properties, the UE does not transmit the PUCCH and PUSCH at the same time. The PUCCH for one UE is allocated to a pair of RBs within one subframe. The pair of RBs occupy different subcarriers within two slots. The pair of RBs allocated to the PUCCH undergo frequency hopping in the boundary of the slots.

DEFINITION OF MIMO TECHNOLOGY

MIMO is abbreviated from Multiple-Input Multiple-Output, and means a method for improving efficiency in data transmission and reception by using multiple transmitting antennas and multiple receiving antennas instead of a single transmitting antenna and a single receiving antenna. Namely, the MIMO technology is to increase capacity or improve throughput by using multiple antennas in a transmitter or receiver of a wireless communication system. Herein, multiple antennas will be referred to as MIMO.

The MIMO technology is an application version of a technology that a single message is completed by receiving data pieces from several antennas without depending on a single antenna path. The MIMO technology can improve a data transmission rate within a specific range or increase a system range for a specific data transmission rate. In this respect, the MIMO technology is a next generation mobile communication technology that can widely be used for a mobile station and a relay station. Also, the MIMO technology has received much attention as a next generation technology that can increase a transmission rate of mobile communication, which has reached the uppermost limit due to extension of data communication.

System Modeling in MIMO

FIG. 7 is a schematic view illustrating a general MIMO communication system. As shown in FIG. 7, if the number of transmitting antennas increases to $N_T$ and the number of receiving antennas increases to $N_R$ at the same time, channel transmission capacity increases theoretically in proportion to the number of antennas unlike that a plurality of antennas are used in only a transmitter or receiver. Accordingly, it is possible to improve a transmission rate and remarkably improve frequency efficiency. A transmission rate according to increase of channel transmission capacity can increase theoretically as much as a value obtained by multiplying a maximum transmission rate $R_o$, which corresponds to a case where one antenna is used, by an increase rate $R_i$ of the following Equation 1.

$$R_i = \min(N_T, N_R) \qquad \text{[Equation 1]}$$

For example, in a MIMO communication system that uses four transmitting antennas and four receiving antennas, a transmission rate four times greater than that of a single antenna system can be obtained. After theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate.

In order to describe a communication method in a MIMO system in more detail, mathematical modeling of the communication method can be expressed as follows. As shown in FIG. 7, it is assumed that $N_T$ transmitting antennas and $N_R$ receiving antennas exist. First of all, a transmitting signal will be described. If there exist $N_T$ transmitting antennas, since the number of maximum transmission information is $N_T$ the transmission information can be expressed by a vector shown in Equation 2 as follows.

$$s = [s_1, s_2, \ldots, s_{N_T}]^T \qquad \text{[Equation 2]}$$

Meanwhile, different kinds of transmission power can be applied to each of the transmission information $s_1, s_2, \ldots, s_{N_T}$. At this time, supposing that each transmission power is $P_1, P_2, \ldots, P_{N_T}$ transmission information of which transmission power is controlled can be expressed by a vector shown in Equation 3 as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Also, $\hat{S}$ can be expressed by Equation 4 below using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, it is considered that a weight matrix W is applied to the information vector $\hat{S}$ of which transmission power is controlled, so as to obtain $N_T$ transmitting signals $x_1, x_2, \ldots, x_{N_T}$. In this case, the weight matrix serves to properly distribute the transmission information to each antenna. Such transmitting signals $x_1, x_2, \ldots, x_{N_T}$ can be expressed by Equation 5 below using a vector X. In this case, $W_{ij}$ means a weight value between the ith transmitting antenna and the jth information. W may be referred to as a weight matrix or precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \qquad \text{[Equation 5]}$$

$$= W\hat{s} = WPs$$

If there exist $N_R$ receiving antennas, receiving signals $y_1, y_2, \ldots, y_{N_R}$ of the respective antennas can be expressed by a vector of Equation 6 below.

$$y = [y_1, y_2, \ldots, y_{N_R}]^T \qquad \text{[Equation 6]}$$

Meanwhile, in case of channel modeling in the MIMO communication system, channels can be classified depending on indexes of transmitting and receiving antennas. In this case, a channel that passes from the jth transmitting antenna to the ith receiving antenna will be expressed as $h_{ij}$. It is noted that index of the receiving antenna is prior to index of the transmitting antenna in index of $h_{ij}$.

Several channels can be grouped into one and then can be expressed by a vector type or a matrix type. The channels of a vector type will be described below. FIG. 8 is a diagram illustrating a channel from $N_T$ transmitting antennas to the ith receiving antenna.

As shown in FIG. 8, the channel from $N_T$ transmitting antennas to the ith receiving antenna can be expressed as follows.

$$h_i^T = [h_{i1}, h_{i2}, \ldots, h_{iN_T}]$$

Also, all channels from $N_T$ transmitting antennas to $N_R$ receiving antennas can be expressed by Equation 8 below through the matrix of Equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad [\text{Equation 8}]$$

Since additive white Gaussian noise (AWGN) is actually added to the channels after the above channel matrix H, AWGN $n_1, n_2, \ldots, n_{N_R}$ added to each of the $N_R$ receiving antennas can be expressed by a vector of Equation 9 below.

$$n = [n_1, n_2, \ldots, n_{N_R}]^T \quad [\text{Equation 9}]$$

The receiving signals obtained using the above equations can be expressed by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix} \quad [\text{Equation 10}]$$

$$= Hx + n$$

Meanwhile, the number of rows and columns of the channel matrix H indicating channel status is determined by the number of transmitting antennas and the number of receiving antennas. The number of rows in the channel matrix H is the same as the number $N_R$ of receiving antennas, and the number of columns is the same as the number $N_T$ of transmitting antennas. In other words, the channel matrix H can be expressed by $N_R \times N_T$ matrix. Generally, rank of the matrix is defined by a smaller number of the number of rows and the number of columns, which are independent from each other. Therefore, the rank of the matrix cannot have a value greater than the number of rows or the number of columns. Rank of the channel matrix H can be expressed by the following Equation 11.

$$\text{rank}(H) \leq \min(N_T, N_R) \quad [\text{Equation 11}]$$

Cyclic Delay Diversity (CDD) in the LTE system

CDD is one of MIMO transmission schemes. In the transmitter, different cyclic delays are added to the same signal and then transmitted through different antennas. The channel is frequency selective due to different cyclic delays, and the receiver can obtain frequency diversity effect due to CDD. FIG. 9 is a diagram illustrating frequency response according to CDD. As shown in FIG. 9, cyclic delay in the time domain is represented by phase shift in the frequency domain. In the LTE system, the CDD can be applied to the frequency domain by giving different frequency shifts to different antennas.

Precoding for large delay CDD will be described. In large delay CDD, precoding for spatial multiplexing will be defined by the following Equation 12.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad [\text{Equation 12}]$$

In the above Equation 12, W(i) represents a P×v sized precoding matrix, and satisfies i=0, 1, ..., $M_{symb}^{ap}-1$ and $M_{symb}^{ap} = M_{symb}^{layer}$. v×v sized diagonal matrix D(i) that supports CDD and v×v sized U matrix are represented by the following Table 1 in accordance with the number v of layers.

TABLE 1

| Number of layers v | U | D(i) |
|---|---|---|
| 2 | $\frac{1}{\sqrt{2}} \begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}} \begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2} \begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

The value of the precoding matrix W(i) is selected from precoder elements included in a base station and a user equipment. The base station can allow the user equipment to select a precoder from a subset of predetermined elements included in a codebook by using a codebook subset. The codebook can be selected from the following Table 2 and Table 3.

TABLE 2

| Codebook index | Number of layers ν | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 3

| Codebook index $u_n$ | | Number of layers ν | | | |
|---|---|---|---|---|---|
| | | 1 | 2 | 3 | 4 |
| 0 | $u_0 = [1\ -1\ -1\ -1]^T$ | $W_0^{(1)}$ | $W_0^{(14)}/\sqrt{2}$ | $W_0^{(124)}/\sqrt{3}$ | $W_0^{(1234)}/2$ |
| 1 | $u_1 = [1\ -j\ 1\ j]^T$ | $W_1^{(1)}$ | $W_1^{(12)}/\sqrt{2}$ | $W_1^{(123)}/\sqrt{3}$ | $W_1^{(1234)}/2$ |
| 2 | $u_2 = [1\ 1\ -1\ 1]^T$ | $W_2^{(1)}$ | $W_2^{(12)}/\sqrt{2}$ | $W_2^{(123)}/\sqrt{3}$ | $W_2^{(3214)}/2$ |
| 3 | $u_3 = [1\ j\ 1\ -j]^T$ | $W_3^{(1)}$ | $W_3^{(12)}/\sqrt{2}$ | $W_3^{(123)}/\sqrt{3}$ | $W_3^{(3214)}/2$ |
| 4 | $u_4 = [1\ (-1-j)/\sqrt{2}\ -j\ (1-j)/\sqrt{2}]^T$ | $W_4^{(1)}$ | $W_4^{(14)}/\sqrt{2}$ | $W_4^{(124)}/\sqrt{3}$ | $W_4^{(1234)}/2$ |
| 5 | $u_5 = [1\ (-1-j)/\sqrt{2}\ j\ (1-j)/\sqrt{2}]^T$ | $W_5^{(1)}$ | $W_5^{(14)}/\sqrt{2}$ | $W_5^{(124)}/\sqrt{3}$ | $W_5^{(1234)}/2$ |
| 6 | $u_6 = [1\ (-1+j)/\sqrt{2}\ -j\ (1+j)/\sqrt{2}]^T$ | $W_6^{(1)}$ | $W_6^{(13)}/\sqrt{2}$ | $W_6^{(134)}/\sqrt{3}$ | $W_6^{(1324)}/2$ |
| 7 | $u_7 = [1\ (-1+j)/\sqrt{2}\ j\ (1+j)/\sqrt{2}]^T$ | $W_7^{(1)}$ | $W_7^{(13)}/\sqrt{2}$ | $W_7^{(134)}/\sqrt{3}$ | $W_7^{(1324)}/2$ |
| 8 | $u_8 = [1\ -1\ 1\ 1]^T$ | $W_8^{(1)}$ | $W_8^{(12)}/\sqrt{2}$ | $W_8^{(124)}/\sqrt{3}$ | $W_8^{(1234)}/2$ |
| 9 | $u_9 = [1\ -j\ -1\ -j]^T$ | $W_9^{(1)}$ | $W_9^{(14)}/\sqrt{2}$ | $W_9^{(134)}/\sqrt{3}$ | $W_9^{(1234)}/2$ |
| 10 | $u_{10} = [1\ 1\ 1\ -1]^T$ | $W_{10}^{(1)}$ | $W_{10}^{(13)}/\sqrt{2}$ | $W_{10}^{(123)}/\sqrt{3}$ | $W_{10}^{(1324)}/2$ |
| 11 | $u_{11} = [1\ j\ -1\ j]^T$ | $W_{11}^{(1)}$ | $W_{11}^{(13)}/\sqrt{2}$ | $W_{11}^{(134)}/\sqrt{3}$ | $W_{11}^{(1324)}/2$ |
| 12 | $u_{12} = [1\ -1\ -1\ 1]^T$ | $W_{12}^{(1)}$ | $W_{12}^{(12)}/\sqrt{2}$ | $W_{12}^{(123)}/\sqrt{3}$ | $W_{12}^{(1234)}/2$ |
| 13 | $u_{13} = [1\ -1\ 1\ -1]^T$ | $W_{13}^{(1)}$ | $W_{13}^{(13)}/\sqrt{2}$ | $W_{13}^{(123)}/\sqrt{3}$ | $W_{13}^{(1324)}/2$ |
| 14 | $u_{14} = [1\ 1\ -1\ -1]^T$ | $W_{14}^{(1)}$ | $W_{14}^{(13)}/\sqrt{2}$ | $W_{14}^{(123)}/\sqrt{3}$ | $W_{14}^{(3214)}/2$ |
| 15 | $u_{15} = [1\ 1\ 1\ 1]^T$ | $W_{15}^{(1)}$ | $W_{15}^{(12)}/\sqrt{2}$ | $W_{15}^{(123)}/\sqrt{3}$ | $W_{15}^{(1234)}/2$ |

For two antenna ports, a precoder is selected in accordance with $W(i)=C_1$, and $C_1$ represents a precoding matrix corresponding to precoder index 0 in Table 2.

For four antenna ports, the user equipment allocates different precoders for different vectors $[x^{(0)}(i)\ \ldots\ x^{(v-1)}(i)]^T$ through a Physical Downlink Shared Channel. The different precoders are used for all ν vectors, and in this case, ν represents the number of transmission layers in case of spatial multiplexing. In particular, the precoder is selected in accordance with $W(i)=C_k$, k is given by $$k = \left(\left\lfloor\frac{i}{v}\right\rfloor \bmod 4\right) + 1 \quad (k = 1, 2, 3, 4,),$$

and $C_1$, $C_2$, $C_3$, $C_4$ represent precoder matrixes respectively corresponding to precoding indexes 12, 13, 14 and 15.

For LTE-A (LTE-Advanced) which is the next generation system of LTE, studies for uplink MIMO transmission have been discussed. Examples of MIMO for uplink transmission include an open-loop MIMO and a closed-loop MIMO. For closed-loop MIMO transmission such as singular value decomposition (SVD), the receiver estimates channel information and feeds a preferred precoding matrix index (PMI) back to the transmitter. The transmitter selects a precoding matrix the most suitable for MIMO transmission based on the feedback information.

However, in case of the open-loop MIMO, precoding information is not transmitted from the base station. Accordingly, a method for selecting a precoding matrix for open-loop MIMO transmission should be considered. Also, in case of retransmission, if a precoding matrix for open-loop MIMO retransmission is the same as the precoding matrix used for initial transmission, the precoding matrix fails to correspond to a time variable channel, whereby throughput may be deteriorated. Moreover, since retransmission means that the precoding matrix selected for initial transmission is not suitable for the given channel, a method for changing a precoding matrix during retransmission in case of open-loop MIMO will be required.

Accordingly, when the user equipment receives a retransmission request from the base station, it should select a precoding matrix different from that used for initial transmission or previous transmission. However, a solution as to how a precoding matrix is selected for open-loop MIMO retransmission has not been suggested until now.

DESCRIPTION OF THE INVENTION

Technical Problems

Accordingly, the present invention is directed to a method for transmitting data to an uplink by applying a precoding matrix in an open-loop MIMO system, which substantially obviates one or more problems due to limitations and disadvantages of the related art.

An object of the present invention is to provide a method for setting a precoding matrix during retransmission in an open-loop MIMO system. By doing so, UE can choose a precoding matrix without any indication.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solutions

To achieve the aforementioned objects of the present invention, in one aspect of the present invention, a method for transmitting data to an uplink by applying a precoding matrix in an open-loop multiple input multiple output (MIMO) system comprises selecting a precoding matrix and applying the selected precoding matrix to data during initial transmission; selecting a precoding matrix and applying the selected precoding matrix to data to be retransmitted; and retransmitting the data to which the precoding matrix is applied, wherein an index of the precoding matrix applied to the data is determined based on the times of current retransmission times of the data and index of the precoding matrix applied during initial transmission of the data.

The index of the precoding matrix is determined by $n=(i+c \times r) \mod N$, n representing the index of the precoding matrix, i representing an index of the precoding matrix applied during initial transmission of the data, r representing the number of current retransmission times of the data, c representing a constant and N representing the number of precoding matrixes.

The index of the precoding matrix applied during initial transmission of the data is 0 or random precoding matrix index.

The data are transmitted through two slots, the precoding matrix is applied in a slot unit, and a precoding matrix index applied to each slot satisfies $n_e=(i_e+2r) \mod N$ and $n_o=(i_o+2r) \mod N$, respectively, $n_e$ representing a precoding matrix index for the even numbered slots for the nth retransmission, $n_o$ representing a precoding matrix index for the odd numbered slots for the nth retransmission, $i_e$ representing the even numbered slot during initial transmission of the data, $i_o$ representing the odd numbered slots during initial transmission of the data, and N representing the number of precoding matrixes.

Also, is $i_e$ or random precoding matrix index, and $i_o$ is 0, $i_o=i_e+1$ or random precoding matrix index.

If a rank is changed, retransmission at the time when the rank is changed is set to initial transmission and a precoding matrix corresponding to the rank is applied to the data.

In another aspect of the present invention, a method for transmitting data to an uplink by applying a precoding matrix in an open-loop multiple input multiple output (MIMO) system comprises selecting a precoding matrix and applying the selected precoding matrix to data during initial transmission; selecting a precoding matrix and applying the selected precoding matrix to data to be retransmitted; and retransmitting the data to which the precoding matrix is applied, wherein an index of the precoding matrix applied to the data is determined based on a subframe number allocated to retransmit the data.

The index of the precoding matrix is determined by $n=(t) \mod N$, n representing the index of the precoding matrix, t representing a subframe number indicating the order of a corresponding subframe on a radio frame, and N representing the number of precoding matrixes.

If a rank is changed, retransmission at the time when the rank is changed is set to initial transmission and a precoding matrix corresponding to the rank is applied to the data.

In other aspect of the present invention, a method for transmitting data to an uplink by applying a precoding matrix in an open-loop multiple input multiple output (MIMO) system comprises selecting a precoding matrix and applying the selected precoding matrix to data during initial transmission; selecting a precoding matrix and applying the selected precoding matrix to data to be retransmitted; and retransmitting the data to which the precoding matrix is applied, wherein the data are transmitted in a subframe unit, the precoding matrix applied in a slot unit of the subframe, and an index of the precoding matrix applied to the slot is determined based on the slot number.

The index of the precoding matrix is determined by $n=(t_s) \mod N$, n representing the index of the precoding matrix, $t_s$ representing a slot number indicating the order of a corresponding slot on a radio frame, and N representing the number of precoding matrixes.

If a rank is changed, retransmission at the time when the rank is changed is set to initial transmission and a precoding matrix corresponding to the rank is applied to the data.

Advantageous Effects

According to the embodiments of the present invention, the following advantages can be obtained.

In the open-loop MIMO system, the UE can select a precoding matrix in accordance with a predetermined rule, whereby system throughput can be improved. No specific indication from its base station is required.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
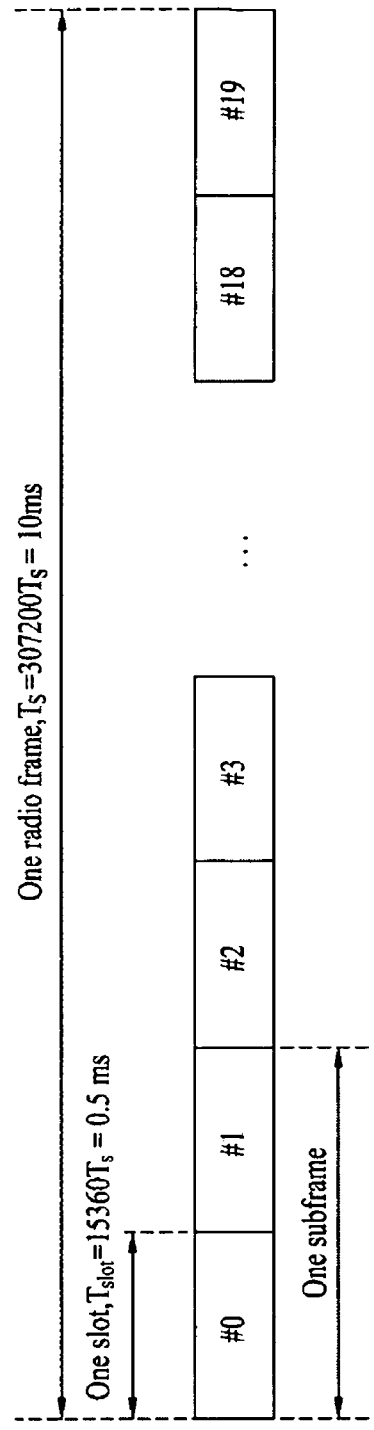
FIG. 1 is a schematic diagram illustrating a general MIMO communication system.
Figure 2:
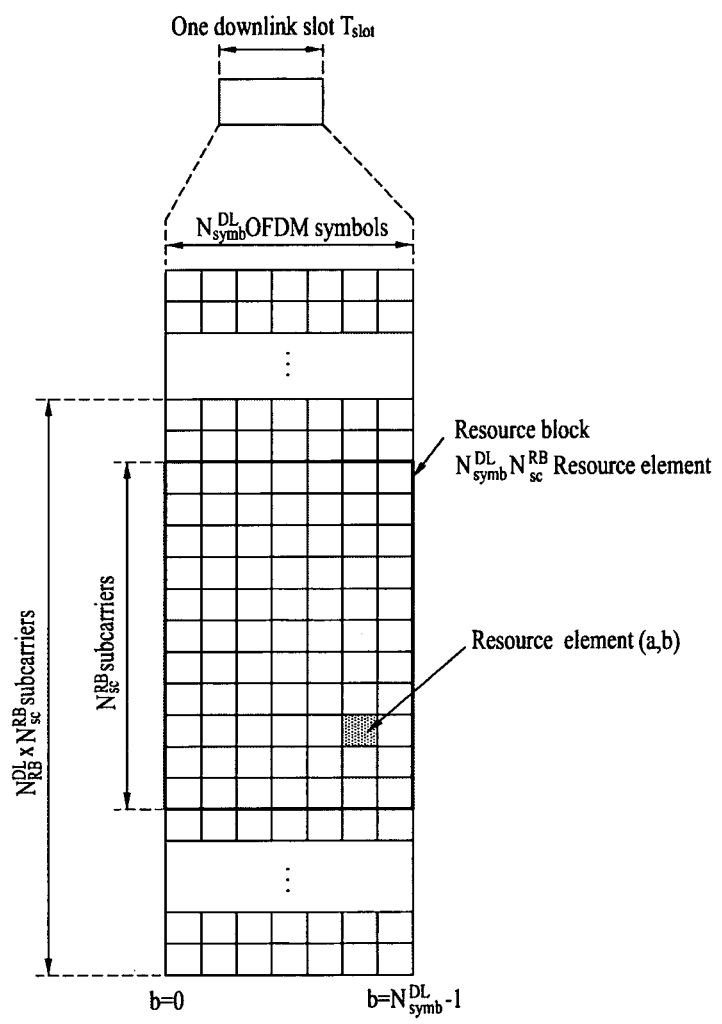
FIG. 2 is a diagram illustrating a structure of a type 2 radio frame.
Figure 3:
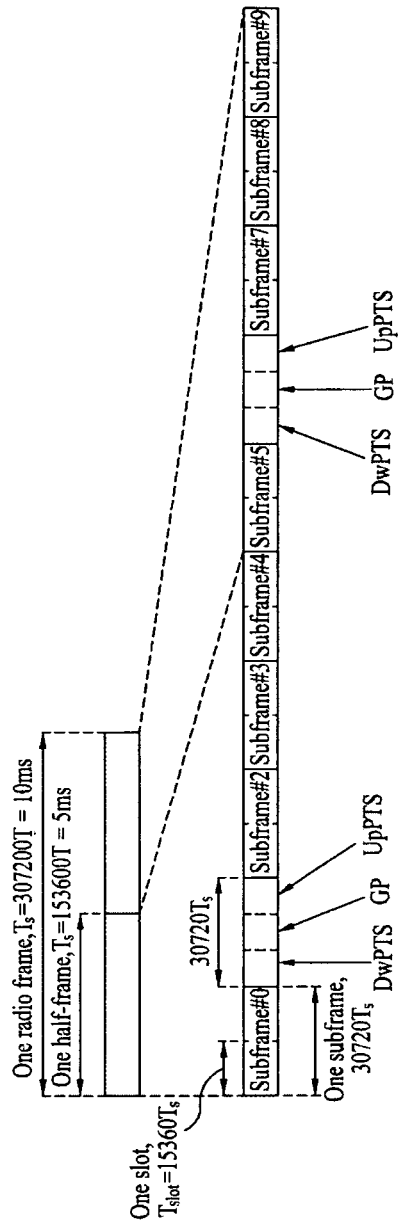
FIG. 3 is a diagram illustrating a slot structure of an LTE downlink.
Figure 4:
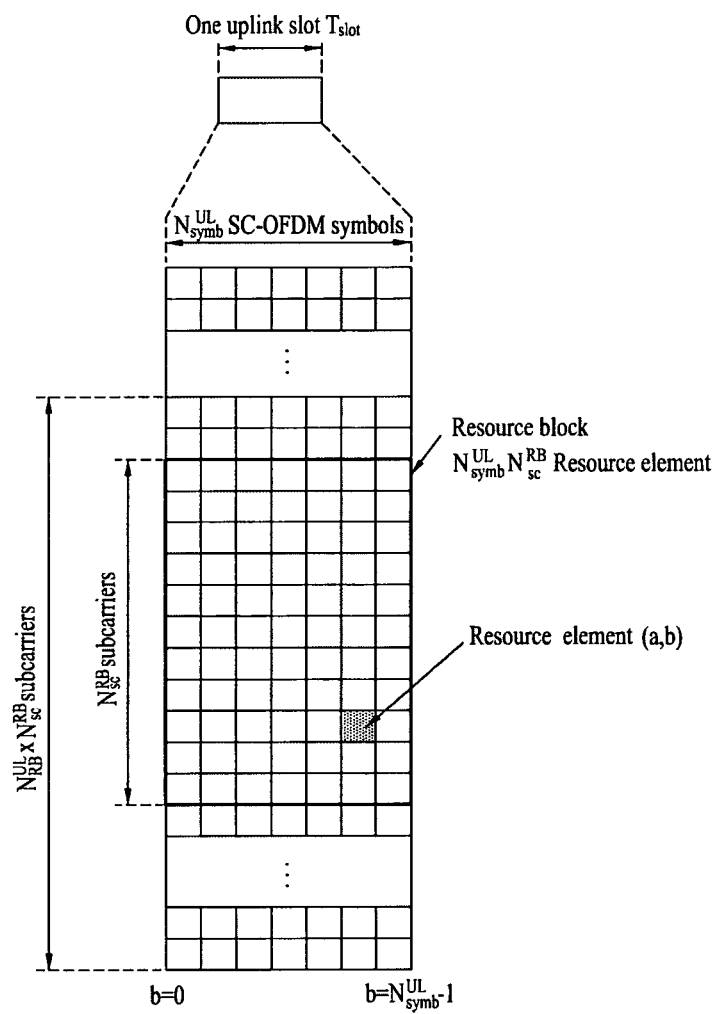
FIG. 4 is a diagram illustrating a slot structure of an LTE uplink.
Figure 5:
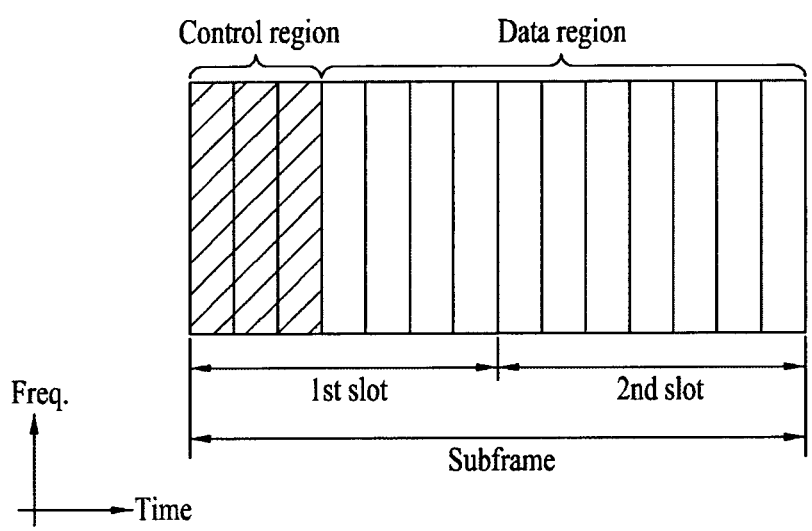
FIG. 5 is a diagram illustrating an example of a structure of a downlink subframe.
Figure 6:
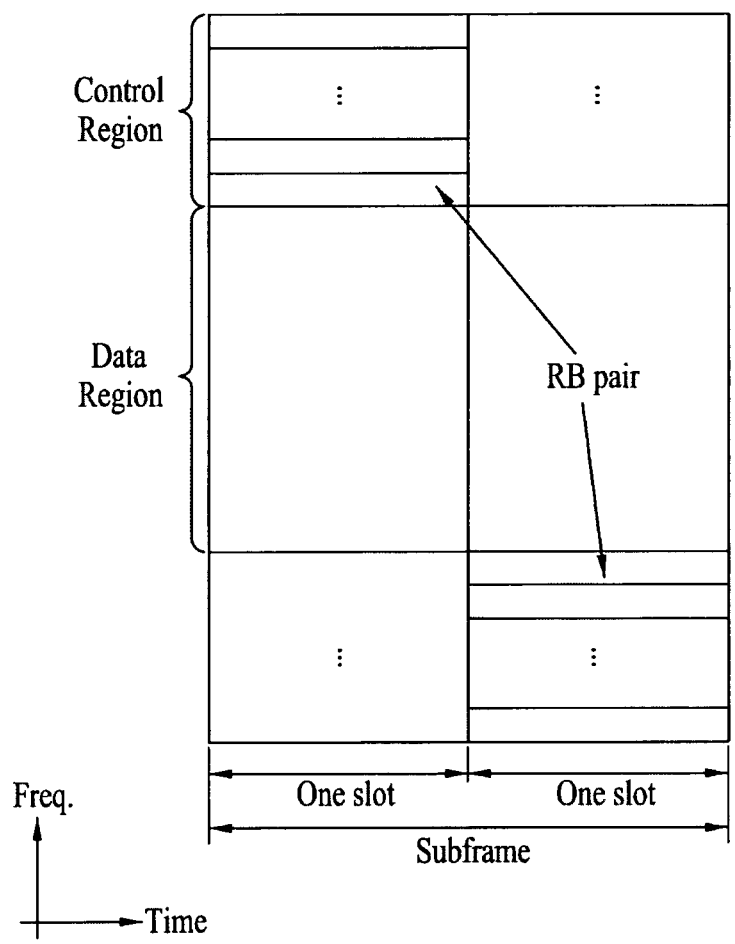
FIG. 6 is a diagram illustrating a structure of an uplink subframe.
Figure 7:
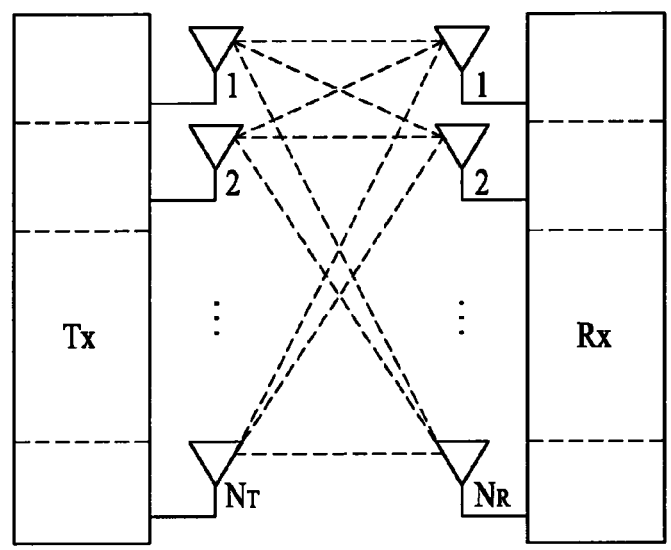
FIG. 7 is a schematic view illustrating a general MIMO communication system.
Figure 8:
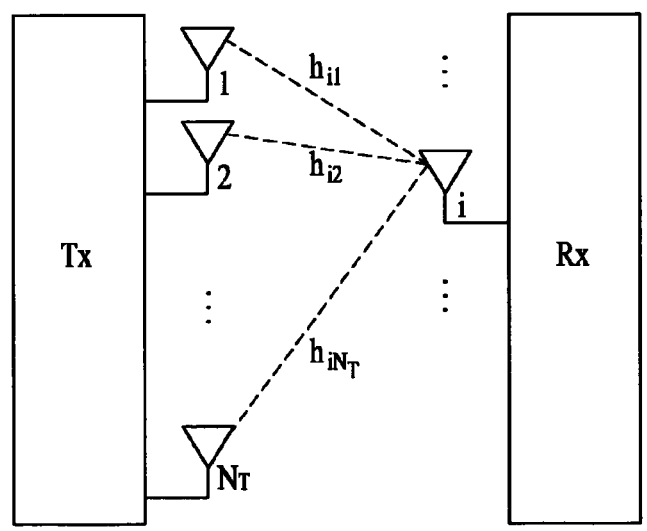
FIG. 8 is a diagram illustrating a channel from $N_T$ transmitting antennas to the ith receiving antenna.
Figure 9:
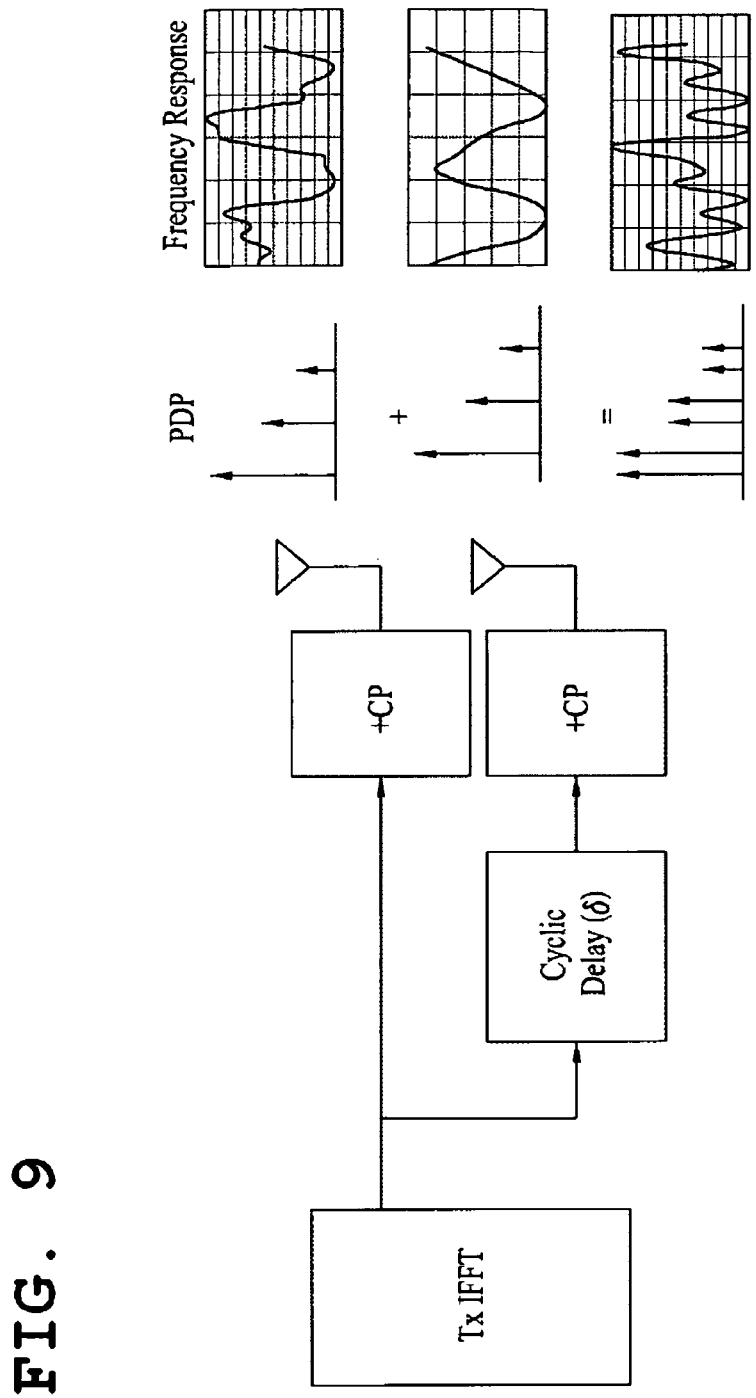
FIG. 9 is a diagram illustrating frequency response according to CDD.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters. For example, the following description will be made based on, but not limited to, some terminologies. And, other random terminologies may be designated to refer to the same meaning. Wherever possible, the same reference numbers will be used throughout the drawings to refer to the same or like parts.

Technology, device and system described hereinafter can be used for various wireless access technologies such as CDMA (Code Division Multiple Access), FDMA (Frequency Division Multiple Access), TDMA (Time Division Multiple Access), OFDMA (Orthogonal Frequency Division Multiple Access), and SC-FDMA (Single Carrier-Frequency Division Multiple Access).

The CDMA can be implemented for wireless technology such as UTRA (Universal Terrestrial Radio Access) or CDMA2000. The TDMA can be implemented for wireless technology such as GSM (Global System for Mobile communications), GPRS (Global Packet Radio Service), and EDGE (Enhanced Data Rate for GSM Evolution). Also, the OFDMA can be implemented in wireless technology such as IEEE 802.11 (Wi-Fi), IEEE 802.16 (WiMAX), and IEEE 802.20, E-UTRA (Evolved-UTRA). The UTRA is a part of UMTS (Universal Mobile Telecommunication System). The 3GPP ($3^{rd}$ Generation Partnership Project) LTE (Long Term Evolution) is a part of E-UMTS (Evolved-UMTS) that uses E-UTRA. The 3GPP LTE applies OFDMA in a downlink, and applies SC-FDMA in an uplink. LTE-A (LTE-Advanced) is an evolved version of 3GPP LTE. Specifically, although the present invention is based on 3GPP LTE and LTE-A, technical features of the present invention are not limited to such 3GPP LTE and LTE-A.

Hereinafter, a method for selecting a precoding matrix for open-loop MIMO transmission will be described. In the present invention, it is assumed that N number of precoding matrixes $W_0, W_1, \ldots, W_{N-1}$ are defined for open-loop MIMO data transmission. In this case, N corresponds to the number of precoding matrixes.

Also, it is assumed that a precoding matrix selected for previous transmission, initial transmission and retransmission is not selected for next transmission.

First Embodiment

This embodiment suggests a method for selecting a precoding matrix for data transmission in an open-loop MIMO system.

First of all, a method for corresponding index of a precoding matrix to the number of retransmission times will be suggested.

For example, it is assumed that the ith precoding matrix $w_i$ is selected for initial transmission. At this time, i represents index of the precoding matrix. 0 or random index can be selected as the initial precoding matrix index. Next precoding matrix $W_{i+1}$ can be used for retransmission. The nth precoding matrix index for nth retransmission can be defined as expressed by the following Equation 13.

$$n=(i+c\times r)\bmod N \quad \text{[Equation 13]}$$

Figure 10:
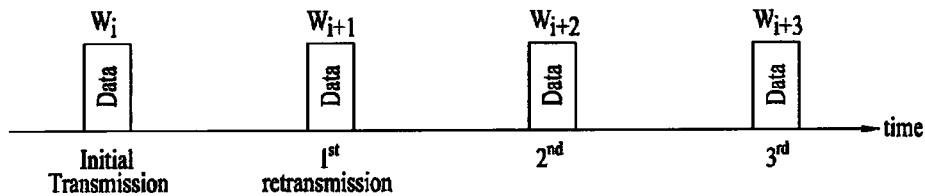
FIG. 10 is a diagram illustrating a method for selecting a precoding matrix during retransmission in an open-loop MIMO system according to the first embodiment of the present invention.

In the Equation 13, i represents index of the precoding matrix, r represents the number of retransmission times, c represents a constant, and N represents the number of precoding matrixes. FIG. 10 is a diagram illustrating a method for selecting a precoding matrix during retransmission in an open-loop MIMO system according to the first embodiment of the present invention. As shown in FIG. 10, a predcoding matrix is selected in accordance with the number of retransmission times during retransmission based on the index of the precoding matrix used during initial transmission.

The method can be applied in a slot unit. If the method is applied in a slot unit, the following Equation 13 can be expressed as illustrated in the following Equation 14.

$$n_e=(i_e+2r)\bmod N$$

$$n_o=(i_o+2r)\bmod N \quad \text{[Equation 14]}$$

Figure 11:
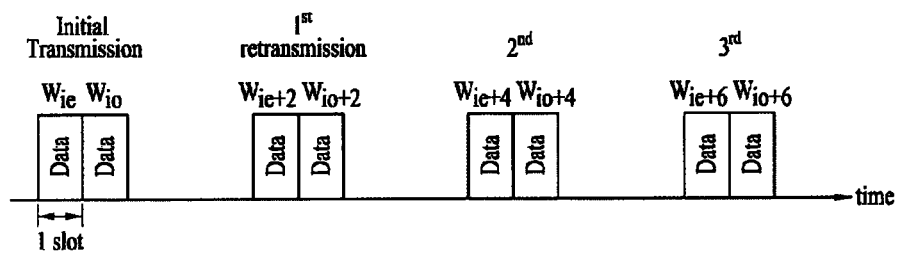
FIG. 11 is a diagram illustrating a method for selecting a precoding matrix in a slot unit in accordance with the number of retransmission times during retransmission in an open-loop MIMO system according to the first embodiment of the present invention.

In the above Equation 14, $n_e$ represents a precoding matrix index for the even numbered slots for the nth retransmission, $n_o$ represents a precoding matrix index for the odd numbered slots for the nth retransmission, $i_e$ represents the even numbered slot during initial transmission, and $i_o$ represents the odd numbered slots during initial transmission. $i_e$ could be 0 or random precoding matrix index, and $i_o$ could be 0, $i_o=i_e+1$ or random precoding matrix index. FIG. 11 is a diagram illustrating a method for selecting a precoding matrix in a slot unit in accordance with the number of retransmission times during retransmission in an open-loop MIMO system according to the first embodiment of the present invention. FIG. 11 is similar to FIG. 10 in that a precoding matrix is selected using the number of retransmission times but is different from FIG. 10 in that a precoding matrix is selected independently in a slot unit.

In the first embodiment of the present invention, the method for selecting a precoding matrix using the number of retransmission times during retransmission in the open-loop MIMO system has been described. Hereinafter, a method for selecting a precoding matrix using subframe or slot number during data transmission in the open-loop MIMO system will be suggested in the second embodiment.

Second Embodiment

In the open-loop MIMO system, index of a precoding matrix for transmitting data can be set variably depending on a subframe allocated for retransmission. The nth precoding matrix index for the nth retransmission can be expressed by the following Equation 15.

$$n=(t)\bmod N \quad \text{[Equation 15]}$$

Figure 12:
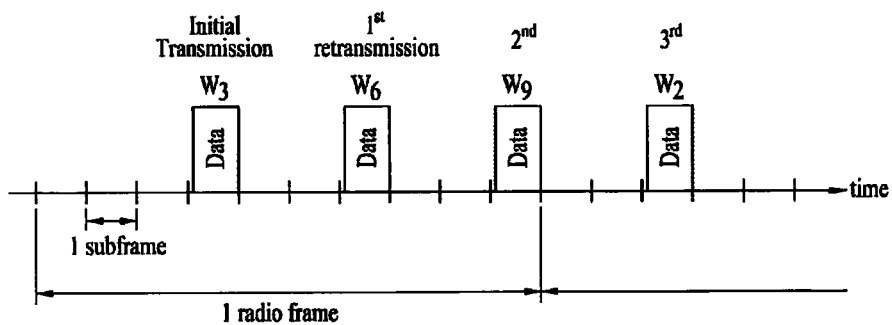
FIG. 12 is a diagram illustrating a method for selecting a precoding matrix in accordance with a subframe number during retransmission in an open-loop MIMO system according to the second embodiment of the present invention.

In the above Equation 15, t represents a subframe number indicating the order of a corresponding subframe on a radio frame, and N represents the number of precoding matrixes. The radio frame includes a total of 10 subframes corresponding to the $0^{th}$ subframe to $9^{th}$ subframe. For example, if the $6^{th}$ subframe is allocated for the first retransmission within the radio frame, a precoding matrix $W_6$ can be used for the first retransmission. Also, if the $9^{th}$ subframe is allocated for the second retransmission within the radio frame, a precoding matrix $W_9$ can be used for the second retransmission. FIG. 12 is a diagram illustrating a method for selecting a precoding matrix in accordance with a subframe number during retransmission in an open-loop MIMO system according to the second embodiment of the present invention. As shown in FIG. 12, a precoding matrix can be allocated using a subframe number included in each radio frame during retransmission.

Figure 13:
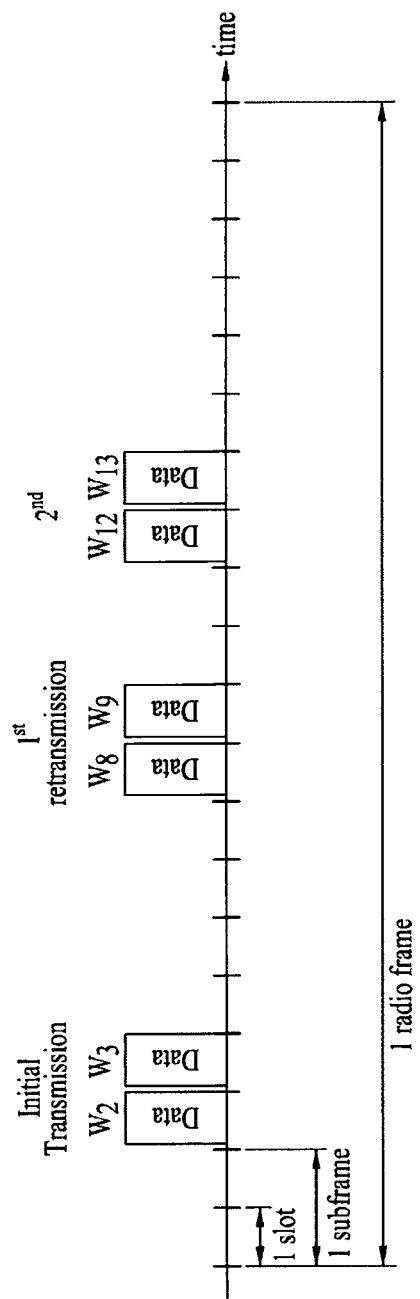
FIG. 13 is a diagram illustrating a method for selecting a precoding matrix in accordance with a slot number during retransmission in an open-loop MIMO system according to the second embodiment of the present invention.

Also, the aforementioned method can be extended in a slot unit. FIG. 13 is a diagram illustrating a method for selecting a precoding matrix in accordance with a slot number during retransmission in an open-loop MIMO system according to the second embodiment of the present invention.

In other words, in the open-loop MIMO system, a precoding matrix can be selected using a slot number during retransmission. The radio frame includes 10 subframes, each of which includes two slots. In the radio frame, when the first slot of the first subframe is supposed to be the $0^{th}$ subframe, the last slot becomes the $19^{th}$ slot. When 0 to 19 are supposed to be slot numbers, the precoding matrix can be selected using the slot numbers during retransmission. This can be expressed by the following Equation 16.

$$n=(t_s) \bmod N \qquad \text{[Equation 16]}$$

In the Equation 16, $t_s$ represents a slot number, and N represents the number of precoding matrixes.

In this embodiment, the method for selecting a precoding matrix using a subframe number or slot number during retransmission in the open-loop MIMO system has been described. The precoding matrix for retransmission needs to be adapted in accordance with a rank of a channel during retransmission.

Third Embodiment

For application of the methods mentioned in the first embodiment and the second embodiment when a rank is changed in accordance with a channel status, the third embodiment suggests that a precoding matrix suitable for the rank changed through a reset process should be selected when retransmission is performed after the rank is changed. The reset process means that a precoding matrix is newly selected in accordance with the changed rank when the rank is changed. In addition to the case where the rank is changed, the reset process can be performed for the case where there is control information for a transmission scheme from the base station. However, if the control information includes clear indication from the base station for selection of the precoding matrix, the user equipment follows the control information.

The following description will be made based on the first embodiment, for example.

Figure 14:
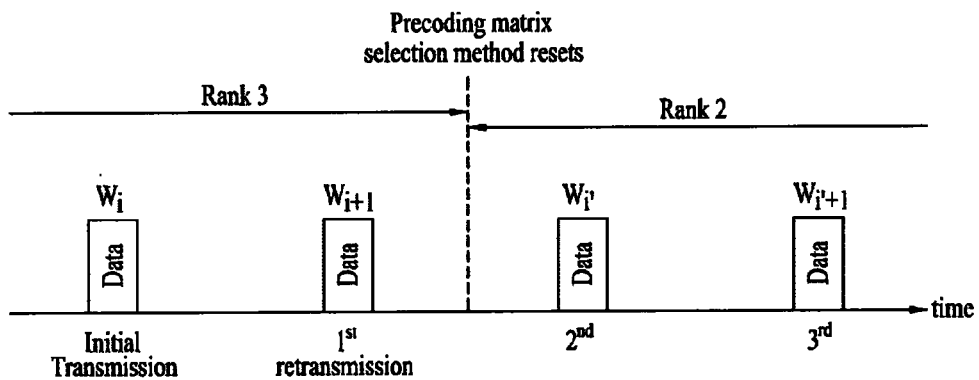
FIG. 14 is a diagram illustrating a method for applying the first embodiment using a reset process if a rank is changed in an open-loop MIMO system according to the third embodiment of the present invention.

FIG. 14 is a diagram illustrating a method for applying the first embodiment using a reset process if a rank is changed in an open-loop MIMO system according to the third embodiment of the present invention. As shown in FIG. 14, if a rank 3 during initial transmission or previous retransmission is changed to a rank 2 during next retransmission, a process for selecting a precoding matrix is newly performed for the changed rank 2.

This embodiment can be applied to the third embodiment as well as the first embodiment.

According to the aforementioned embodiment of the present invention, the base station selects a precoding matrix in accordance with a predetermined rule, whereby system throughput can be improved.

Figure 15:
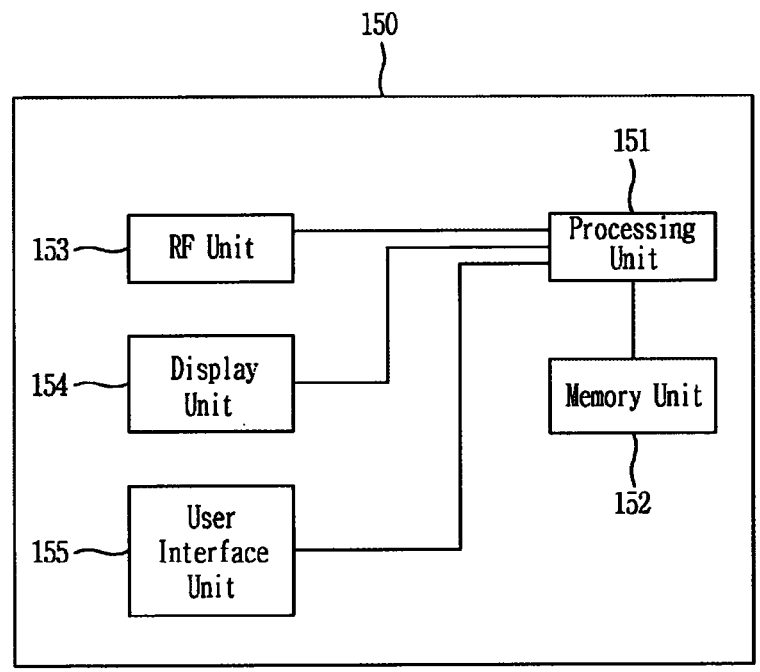
FIG. 15 is a block diagram illustrating a device that can be applied to a base station and a user equipment and can perform the aforementioned method.

FIG. 15 is a block diagram illustrating a device that can be applied to a base station and a user equipment and can perform the aforementioned method. As shown in FIG. 15, the device 150 includes a processing unit 151, a memory unit 152, a radio frequency (RF) unit 153, a display unit 154 and a user interface unit 155. A layer of a physical interface protocol is performed in the processing unit 151. The processing unit 151 provides a control plane and a user plane. A function of each layer can be performed in the processing unit 151. The memory unit 152 is electrically connected with the processing unit 151 and stores an operating system, application program, and general files. If the device 150 is a user equipment, the display unit 154 can display various kinds of information, and can be implemented using LCD (Liquid Crystal Display), OLED (Organic Light Emitting Diode), etc., which are known. The user interface unit 155 and can be configured by combination of well known user interfaces such as key pad and touch screen. The RF unit 153 is electrically connected with the processing unit 151, controlled by the processing unit 151, and transmits or receives a radio signal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

In the present invention, the user equipment (UE) can be replaced with terms such as a mobile station (MS), a subscriber station (SS), a mobile subscriber station (MSS), and a mobile terminal.

Meanwhile, examples of the user equipment (UE) according to the present invention include a personal digital assistant (PDA), a cellular phone, a personal communication service (PCS) phone, a global system for mobile (GSM) phone, a wideband CDMA (WCDMA) phone, and a mobile broadband system (MBS) phone.

The embodiments according to the present invention can be implemented by various means, for example, hardware, firmware, software, or their combination.

If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a user equipment, a base station or other equipment of a wireless mobile communication system.

What is claimed is:

1. A method for transmitting data to an uplink by applying a precoding matrix in an open-loop multiple input multiple output (MIMO) system, the method comprising:
   selecting a precoding matrix and applying the selected precoding matrix to data during initial transmission;
   selecting a precoding matrix and applying the selected precoding matrix to data to be retransmitted; and
   retransmitting the data to which the precoding matrix is applied,
   wherein an index of the precoding matrix applied to the data is determined based on the times of current retransmission times of the data and index of the precoding matrix applied during initial transmission of the data, and
   wherein the index of the precoding matrix is determined by $n=(i+c \times r) \mod N$, n representing the index of the precoding matrix, i representing an index of the precoding matric applied during initial transmission of the data, r representing the number of current retransmission times of the data, c representing a constant, and N representing the number of precoding matrices.

2. The method of claim 1, wherein the index of the precoding matrix applied during initial transmission of the data is 0 or random precoding matrix index.

3. The method of claim 1, wherein the data are transmitted through two slots, the precoding matrix is applied in a slot unit, and a precoding matrix index applied to each slot satisfies $n_e=(i_e+2r) \mod N$ and $n_o=(i_o+2r) \mod N$, respectively, $n_e$ representing a precoding matrix index for the even numbered slots for the n-th retransmission, $n_o$ representing a precoding matrix index for the odd numbered slots for the n-th retransmission, $i_e$ representing the even numbered slot during initial transmission of the data, $i_o$ representing the odd numbered slots during initial transmission of the data, and N representing the number of precoding matrices.

4. The method of claim 3, wherein $i_e$ is 0 or random precoding matrix index, and $i_o$ is 0, $i_o=i_e+1$ or random precoding matrix index.

5. The method of claim 1, wherein, if a rank is changed, retransmission at the time when the rank is changed is set to initial transmission and a precoding matrix corresponding to the rank is applied to the data.

6. A method for transmitting data by applying a precoding matrix in an open-loop multiple input multiple output (MIMO) system, the method comprising:
   selecting a precoding matrix and applying the selected precoding matrix to data during initial transmission;
   selecting a precoding matrix and applying the selected precoding matrix to data to be retransmitted; and
   retransmitting the data to which the precoding matrix is applied,
   wherein an index of the precoding matrix applied to the data is determined based on a subframe number allocated to retransmit the data, and
   wherein the index of the precoding matrix is determined by $n=(t) \mod N$, n representing the index of the precoding matrix, t representing a subframe number indicating the order of a corresponding subframe on a radio frame, and N representing the number of precoding matrices.

7. The method of claim 6, wherein, if a rank is changed, retransmission at the time when the rank is changed is set to initial transmission and a precoding matrix corresponding to the rank is applied to the data.

8. A method for transmitting data by applying a precoding matrix in an open-loop multiple input multiple output (MIMO) system, the method comprising:
   selecting a precoding matrix and applying the selected precoding matrix to data during initial transmission;
   selecting a precoding matrix and applying the selected precoding matrix to data to be retransmitted; and
   retransmitting the data to which the precoding matrix is applied,
   wherein the data are transmitted in a subframe unit, the precoding matrix applied in a slot unit of the subframe, and an index of the precoding matrix applied to the slot is determined based on the slot number, and
   wherein the index of the precoding matrix is determined by $n=(t_s) \mod N$, n representing the index of the precoding matrix, $t_s$ representing a slot number indicating the order of a corresponding slot on a radio frame, and N representing the number of precoding matrices.

9. The method of claim 8, wherein, if a rank is changed, retransmission at the time when the rank is changed is set to initial transmission and a precoding matrix corresponding to the rank is applied to the data.

* * * * *